(12) United States Patent
Cheng et al.

(10) Patent No.: US 12,348,488 B2
(45) Date of Patent: Jul. 1, 2025

(54) DEVICES, METHODS, AND COMPUTER-READABLE MEDIA FOR DEPLOYING MODULAR NETWORK ARCHITECTURE

(71) Applicant: MASTERCARD TECHNOLOGIES CANADA ULC, Vancouver (CA)

(72) Inventors: Ian Cheng, Vancouver (CA); Carlos Eduardo Martell Ayala, Coquitlam (CA); I-Cheng Wang, Surrey (CA); Christopher Zhu Tan, Richmond (CA); Jonathan Pelletier, Montreal (CA); Saad Zaamout, Calgary (CA)

(73) Assignee: MASTERCARD TECHNOLOGIES CANADA ULC, Vancouver (CA)

( * ) Notice: Subject to any disclaimer, the term of this patent is extended or adjusted under 35 U.S.C. 154(b) by 444 days.

(21) Appl. No.: 17/667,437

(22) Filed: Feb. 8, 2022

(65) Prior Publication Data

US 2022/0255901 A1    Aug. 11, 2022

Related U.S. Application Data

(60) Provisional application No. 63/147,597, filed on Feb. 9, 2021.

(51) Int. Cl.
*H04L 9/40* (2022.01)
*G06Q 20/38* (2012.01)

(52) U.S. Cl.
CPC ....... *H04L 63/0272* (2013.01); *G06Q 20/382* (2013.01); *H04L 2463/102* (2013.01)

(58) Field of Classification Search
CPC .......... H04L 63/0272; H04L 2463/102; G06Q 20/382

USPC .......................................................... 726/15
See application file for complete search history.

(56) References Cited

U.S. PATENT DOCUMENTS

| | | | |
|---|---|---|---|
| 9,419,857 B1* | 8/2016 | Ryan | H04L 63/08 |
| 9,432,335 B1* | 8/2016 | Stevenson | H04L 63/0272 |
| 10,484,331 B1* | 11/2019 | Rossman | H04L 63/0209 |
| 11,330,070 B1* | 5/2022 | Nair | H04L 67/561 |
| 11,470,047 B1* | 10/2022 | Shevade | H04L 12/4641 |
| 11,593,103 B1* | 2/2023 | Chawda | G06F 11/3612 |

(Continued)

OTHER PUBLICATIONS

International Search Report and Written Opinion for Application No. PCT/CA2022/050174 dated May 10, 2022 (8 pages).

*Primary Examiner* — Moeen Khan
(74) *Attorney, Agent, or Firm* — Michael Best & Friedrich LLP

(57) ABSTRACT

Devices, systems, methods, and non-transitory computer-readable media for modular network architecture. In one embodiment, a server includes a memory and an electronic processor. The memory stores cloud infrastructure definitions, the cloud infrastructure definitions including a plurality of microservices and security groups that define communication between each of the plurality of microservices. The electronic processor is configured to deploy a first virtual private cloud including a first portion of the plurality of microservices and all of the security groups, deploy a second virtual private cloud including a second portion of the plurality of microservices and the all of the security groups, and deploy a third virtual private cloud including a third portion of the plurality of microservices and the all of the security groups.

20 Claims, 5 Drawing Sheets

(56) References Cited

U.S. PATENT DOCUMENTS

| | | |
|---|---|---|
| 11,803,766 B1* | 10/2023 | Srinivasan ............... G06N 5/04 |
| 2018/0307859 A1 | 10/2018 | LaFever et al. |
| 2020/0320489 A1 | 10/2020 | Vagare et al. |
| 2020/0366752 A1* | 11/2020 | White ................. G06F 11/3409 |
| 2021/0112081 A1* | 4/2021 | Nedbal ................. H04L 63/104 |

* cited by examiner

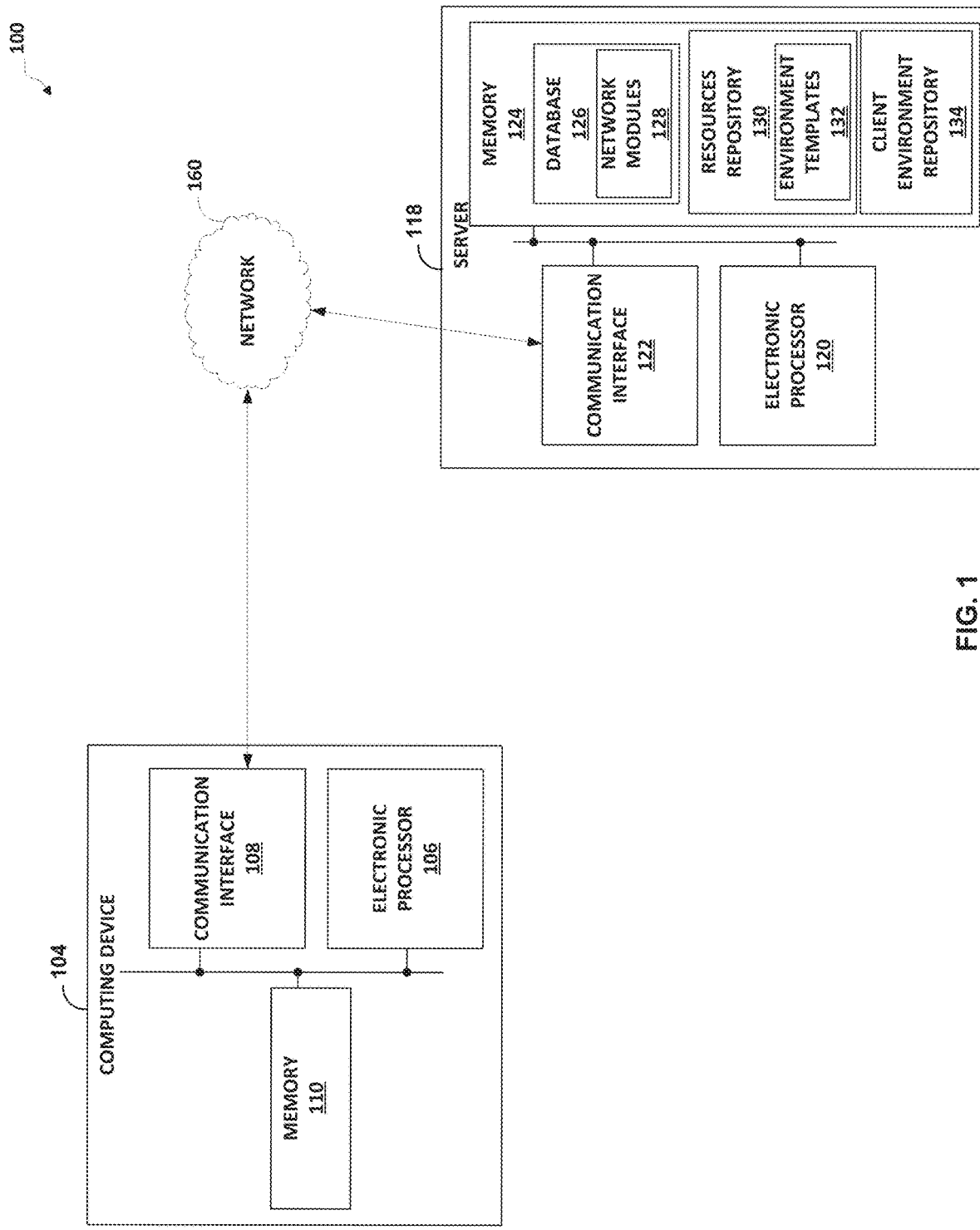

DEVICES, METHODS, AND COMPUTER-READABLE MEDIA FOR DEPLOYING MODULAR NETWORK ARCHITECTURE

CROSS-REFERENCE TO RELATED APPLICATION

This application claims priority to, and the benefit of, U.S. Provisional Application No. 63/147,597, filed on Feb. 9, 2021, and the contents of which are hereby incorporated by reference.

FIELD OF INVENTION

The present disclosure relates generally to network architecture. More specifically, the present disclosure relates to devices, methods, and computer-readable media for deploying a modular network architecture.

SUMMARY

The devices, methods, and computer-readable media relating to embodiments envisioned herein for modular network architecture (referred to herein as "network modules"). In particular, security groups are used to manage communication between different microservices in different network modules. Each resource within a microservice is attached to a security group for that microservice. Within each security group, other microservice security groups are set as ingress and egress destinations which allows for whitelisting without needing to specify specific Classless Inter-Domain Routing (CIDR) ranges. The security groups provide the flexibility to use the same set of rules regardless of the underlying internet protocol (IP) mapping.

However, each network module is unique in that not every microservice will be deployed. Some microservices are specific to certain environments. This "uniqueness" causes a "chicken and egg" problem when trying to specify relationships using security groups.

To solve the "chicken and egg" problem, in embodiments, each microservice security group is always created regardless of whether the corresponding microservice is deployed in the environment. The creation of microservice security groups without corresponding microservices creates one or more empty security groups with no ingress or egress rules and is used solely to group together resources. In each microservice's definition, upon deployment, each microservice will add in the appropriate ingress and egress (communication) rules for that particular microservice. Since both ingress and egress rules are defined, two microservices must match their ingress and egress rules in order to communicate with each other. One embodiment of the present disclosure includes a server including a memory and an electronic processor communicatively connected to the memory. The memory stores a cloud infrastructure including a plurality of microservices and security groups that define communication between each of the plurality of microservices. The electronic processor is configured to deploy a first virtual private cloud including a first portion of the plurality of microservices and all of the security groups, the first portion excluding Payment Card Industry compliant (PCI-compliant) microservices and less than all of the plurality of microservices, deploy a second virtual private cloud including a second portion of the plurality of microservices and the all of the security groups, the second portion including PCI-compliant applications with production data and less than the all of the plurality of microservices, and deploy a third virtual private cloud including a third portion of the plurality of microservices and the all of the security groups, the third portion including PCI-compliant applications with non-production data and less than the all of the plurality of microservices.

Another embodiment of the present disclosure includes a method. The method includes deploying, with a server, a first virtual private cloud including a first portion of a plurality of microservices of a cloud infrastructure and all security groups of the cloud infrastructure, the first portion excluding PCI-compliant microservices and less than all of the plurality of microservices, and the security groups define communication between each of the plurality of microservices. The method includes deploying, with the server, a second virtual private cloud including a second portion of the plurality of microservices and the all of the security groups, the second portion including PCI-compliant applications with production data and less than the all of the plurality of microservices. The method includes deploying, with the server, a third virtual private cloud including a third portion of the plurality of microservices and the all of the security groups, the third portion including PCI-compliant applications with non-production data and less than the all of the plurality of microservices.

Yet another embodiment of the present disclosure includes a non-transitory computer-readable medium comprising instructions that, when executed by an electronic processor, causes the electronic processor to perform a set of operations. The set of operations includes deploying a first virtual private cloud including a first portion of a plurality of microservices of a cloud infrastructure and all security groups of the cloud infrastructure, the first portion excluding PCI-compliant microservices and less than all of the plurality of microservices, and the security groups define communication between each of the plurality of microservices. The set of operations includes deploying a second virtual private cloud including a second portion of the plurality of microservices and the all of the security groups, the second portion including PCI-compliant applications with production data and less than the all of the plurality of microservices. The set of operations also includes deploying a third virtual private cloud including a third portion of the plurality of microservices and the all of the security groups, the third portion including PCI-compliant applications with non-production data and less than the all of the plurality of microservices.

BRIEF DESCRIPTION OF THE FIGURES

FIG. 1 is a block diagram illustrating an example system for deploying each environment into one overarching deployment, in accordance with various aspects of the present disclosure.

DETAILED DESCRIPTION OF THE EMBODIMENTS

Figure 2A:
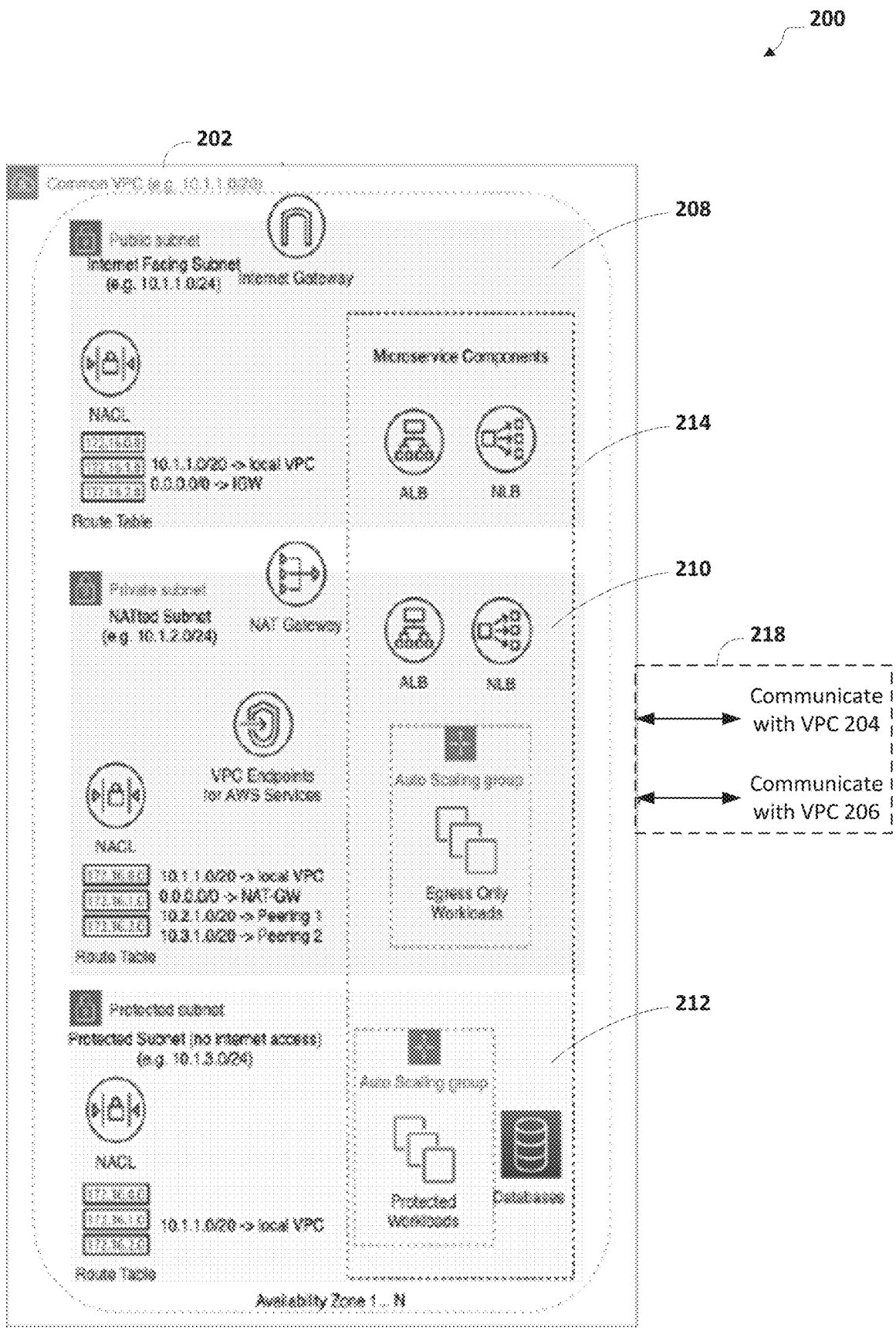
FIG. 2A is an example of common virtual private cloud (VPC) that is deployed with all microservices, in accordance with various aspects of the present disclosure.

As described herein, each environment is deployed into one overarching deployment consisting of different modules to improve the security of environment deployments. Each environment may be spun up using the same set of tools but with different configurations to enable and disable modules.

FIG. 1 illustrates an example system 100 for deploying each environment into one overarching deployment. In the example of FIG. 1, the system 100 includes a computing device 104, a server 118, and a network 140.

The server 118 may be owned by, or operated by or on behalf of, an administrator. The server 118 may also be implemented by one or more networked computer servers.

The computing device 104 includes an electronic processor 106, a communication interface 108, and a memory 110. The electronic processor 106 is communicatively coupled to the communication interface 108 and the memory 110. The computing device 104 is used to access the server 118 for deploying each environment into one overarching deployment. For example, the electronic processor 106 controls the communication interface 108 to communicate with the server 118.

The server 118 includes an electronic processor 120, a communication interface 122, and a memory 124. The electronic processor 120 is communicatively coupled to the communication interface 122 and the memory 124. The electronic processor 120 is a microprocessor or another suitable processing device. The communication interface 122 may be implemented as one or both of a wired network interface and a wireless network interface. The memory 124 is one or more of volatile memory (e.g., RAM) and non-volatile memory (e.g., ROM, FLASH, magnetic media, optical media, et cetera). In some examples, the memory 124 is also a non-transitory computer-readable medium. The memory 124 may be, at least in part, implemented as network storage that is external to the server 118 and accessed via the communication interface 122. For example, all or part of memory 124 may be housed on the "cloud." The memory 124 includes a database 126 for storing network modules 128, a resources repository 130 for storing environment templates 132 to provision particular environment, and a client environment repository 134 for storing all of the configurations to spin up a particular environment.

Each of the network modules 128 is a single-tool configuration of an application/component/infrastructure (for example, CloudFormation, Terraform, Serverless). The network modules 128 are represented in a separate folder with at least one env file. The network modules 128 may have multiple stack files and each of the stack files may have multiple stacks. The stack files contain all of the needed resources. For example, one of the network modules 128 may include a stack_file_1.yaml and an env_file.env.

The resources repository 130 is organized into separate folders: a cloud infrastructure deployment folder (e.g., cloudformation), a hooks folder, a lookups folder, and a modules folder. The following templates, scripts, and definitions are environment agnostic and some or all of the templates, scripts, and definitions may be included in a particular environment.

The cloud infrastructure deployment folder includes a microservice-templates subfolder and a templates subfolder. The microservice-templates subfolder includes infrastructure deployment templates in yml format that are specific to different microservices. Each template contains all Amazon Web Service (AWS) resources associated with that particular microservice except its Security Groups, AutoScaling Groups, Launch Configurations, and EC2 instances. The templates subfolder 144 includes non-microservice infrastructure deployment templates in yml format that are not tied to a particular microservice and are at the account level. For example, the non-microservice infrastructure deployment templates are standardized setups for Route 53 Hosted Zones, Simple Queue Service (SQS) Queues, Simple Notification Service (SNS) Topics, or other suitable standardized setups.

The hooks folder includes hooks that are short generic scripts associated with a particular action (e.g., clearing default security group rules, upload lambda functions). The hooks may be run as part of an invocation of a particular network module.

The lookups folder includes lookup scripts that may use either AWS application programming interface (API) calls directly or Systems Manager (SSM) to retrieve information about the environment. For example, the lookup scripts may be used to retrieve private IPs of particular key services. The modules folder includes definitions for Blueprints that may be imported as modules to create more complex application definitions.

The main project file (for example, infrastructure.yml) is located in the root directory of the client environment repository 134. The main project file contains the parameters and directives to deploy the modules which are needed in the specified environment. For example, the main project file may include application-managed-policies that define the creation of managed identity and access management (IAM) policies which are used to define roles used by users and services. The main project file may also include a certificate_validation.cfn directive that defines the module needed to automatically validate AWS Certificate Manager (ACM) certificates using DNS validation (as opposed to e-mail validation which requires manual verification). The main project file may also include a custom_hostedzone.cfn directive that defines the module needed to create a hosted zone that differs from the default domain used by the environment. The encryption-keys.cfn directive defines the module needed to create Key Management Service (KMS) encryption keys for each environment. The extras directive contains infrastructure templates for one-off features which are required by the particular environment. The hostedzones.cfn directive defines the module needed to create the hosted zones which will be used as the default domain for the environment. The iam-monitoring-roles.cfn directive defines the creation of managed IAM roles related to monitoring services (e.g. Splunk, DataDog, etc.). The iam-operation-roles.cfn directive defines the creation of managed IAM roles which are to be assumed by human users (e.g. job-function based roles like Developer or DataScientist. The iam-service-roles.cfn directive defines the creation of managed IAM roles which are to be assumed by AWS Services (e.g. CloudFormation, EC2, etc.). The microservices file contains subfolders for each of our microservices which are defined here as separate modules.

For example, the microservices files may include 00-security-group-rules.yaml that contains all the security group rules (not the security group itself) which define this particular microservice communicate to other microservices.

Both services must have corresponding rules with each other in order for communication to occur. By requiring both sides to match, a particular environment can still function if a particular microservice is not deployed because other microservices will not have strict dependencies on the missing microservice. Additionally, the microservices files may also include 01-service.yaml that contains the module definition for the particular microservice. This is generally just the environment-specific parameters which are sent to the information definition from the resources repository 130.

The monitor-services directive defines the modules needed to create infrastructure related to monitoring services (e.g. Splunk, DataDog). The networking directive defines the network pieces related to a standard setup of the environment. As described in greater detail below with respect to FIG. 2, the standard setup includes three virtual private clouds (VPCs): 1) a common VPC for most microservices, 2) a PCI non-production VPC for PCI applications which have non-production data, and 3) a PCI VPC for PCI applications that have production data. The networking directive also contains definitions for NACLs, Peering Connections, and Route Tables. The queue directive defines creation of globally used SQS queues within the environment. The security-groups directive defines the creation of security groups within the environment. These are created for every microservice regardless of whether the microservice is deployed into the environment or not. Each security group is created with a set of common rules but no microservice-specific rules. The security-services directive defines the creation and configuration of AWS security services (e.g., Cloudtrail, Config, GuardDuty, and Inspector). Lastly, the storage directive defines the creation and configuration of S3 buckets to be used by the environment.

The client environment repository 134 stores configurations for multiple different environments, each of which may have differing configurations. This means that each environment will be represented by its own environment branch. Any new addition which is to be generic across all environments should be created within its own feature branch, merged into the master, and then merged into the environment branches for which it is applicable. This multi-spoke branching strategy may cause a lot of drift between different environment configurations so it is important to merge from master frequently as to not digress too much.

The cloud infrastructure definitions, which may be accessed by the computing device 104, has options to deploy any number of the directives described above. Each deployment may contain any number of modules which may be deployed as a single unit. The common components (e.g., IAM role creation and networking components) are listed as their own deployment which would target multiple regions. A list of region-specific deployments only deploys microservices that are used in a particular region. The list of region-specific deployments ensures that the cloud infrastructure definitions are able to only deploy what is needed for any given environment.

The cloud infrastructure definitions have a deploy function including an interactive client-based deployment menu. The interactive client-based deployment menu may be used to deploy specific deployments of the cloud infrastructure definitions. The issues with using the interactive client-based deployment menu frequently is that the cloud infrastructure definitions will only look at the changes and dependencies associated with a particular deployment which means that the interactive client-based deployment menu may introduce drift between infrastructure environment definitions and the actual resources within that environment itself.

In order to ensure consistency between the cloud infrastructure definitions and the various environments, a server runs a full (or "all") deployment of the cloud infrastructure definitions every time the server pushes an update. The primary method for the full deployment is via a Jenkins job which provides auditability and a common deployment log for successes and failures. This Jenkins job takes an AWS account and a version control system branch (e.g., a codecommit branch) as parameters and runs a full deployment of the cloud infrastructure definitions for the specified environment.

Figure 2B:
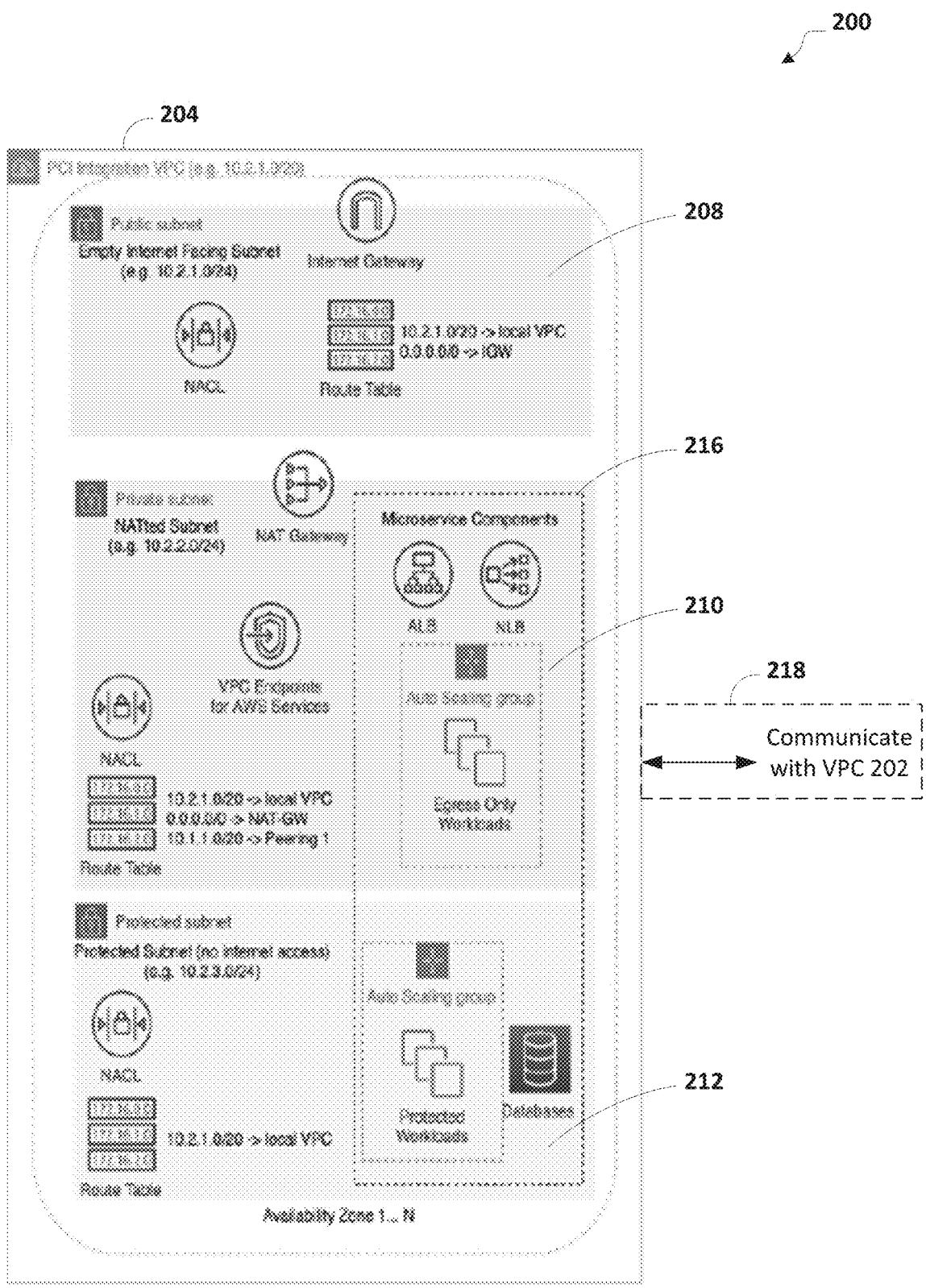
FIG. 2B is an example of a first PCI-Compliant VPC that is for production PCI microservices and data, in accordance with various aspects of the present disclosure.
Figure 2C:
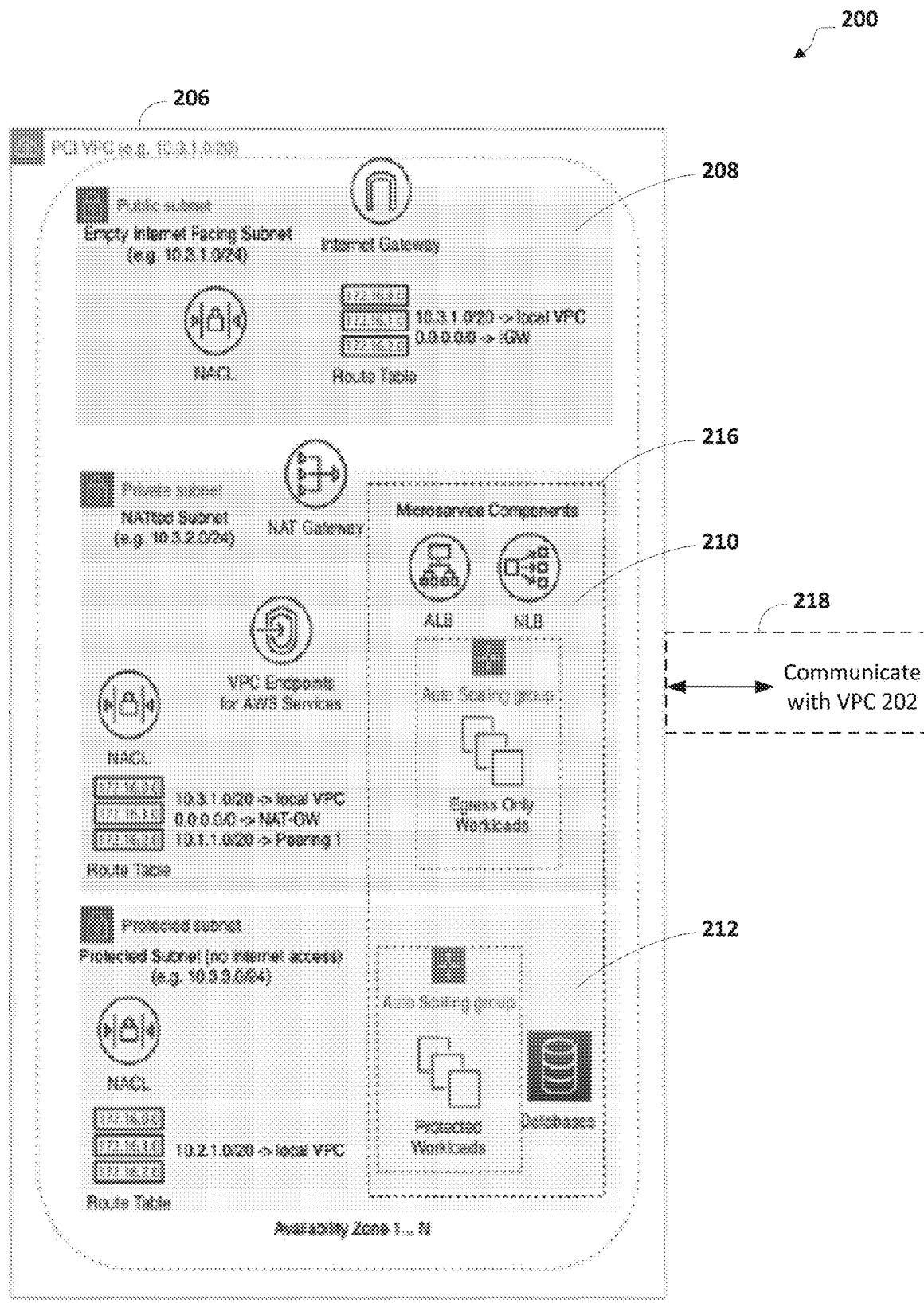
FIG. 2C is an example of a second PCI-Compliant VPC that is for testing PCI microservices with non-production data, in accordance with various aspects of the present disclosure.

FIGS. 2A-2C are diagrams that illustrate an example overarching deployment 200 of a cloud infrastructure definitions. As illustrated in FIG. 2A, the example deployment 200 includes most of the microservices into a single common VPC and uses security groups (e.g., firewall rules) as the network boundary between microservices. This means that all microservices will be deployed into the same set of VPCs and subnets. This also means that communication between microservices is defined by security groups which specify exactly which microservices have ingress and egress rules to which other microservices and what ports they are allowed to communicate on.

Each environment is carved into 3 separate VPCs. FIG. 2A is an example of a common VPC 202 that is deployed with all microservices 214, in accordance with various aspects of the present disclosure. The exception to the common VPC 202 is any microservices that must be PCI-Compliant.

For the PCI-Compliant microservices, there are two separate VPCs to fully segregate PCI traffic from non-PCI traffic. FIG. 2B is an example of a first PCI-Compliant VPC 204 that is for production PCI microservices 216 and data, in accordance with various aspects of the present disclosure. FIG. 2C is an example of a second PCI-Compliant VPC 206 that is for testing PCI microservices 216 with non-production data, in accordance with various aspects of the present disclosure. The second PCI-Compliant VPC 206 may be used to ensure that PCI workflows are correct.

Each of the VPCs 202-206 follow a three-tier subnet architecture, which spans three availability zones (e.g., three data centers). The top tier 208 is a "public" subnet which has internet gateways and is accessible from the internet. The middle tier 210 is a "private" subnet which does not have an internet gateway but can still reach the internet using a network address translation (NAT) gateway attached the public subnet. The bottom tier 212 is the "protected" subnet which cannot access the internet in any way. This three-tier approach ensures that traffic must flow from tier to tier in a certain manner which allows for appliances to be added for traffic inspection if required.

In the example of FIG. 2, security groups are being used to manage communication 218 between different microservices. As illustrated in FIG. 2, the communication 218 occurs between the common VPC 202 and the first PCI-Compliant VPC 204 and between the common VPC 202 and the second PCI-Compliant VPC 206.

Each resource within a microservice is attached to a security group for that microservice. Within each security group, other microservice security groups are set as ingress and egress destinations which allows for whitelisting without needing to specify specific CIDR ranges. The security groups provide the flexibility to use the same set of rules regardless of the underlying IP mapping. However, not every microservice will be deployed in every environment. Some microservices are specific to certain environments and thus will cause a "chicken and egg" problem when trying to specify relationships using security groups.

In order to overcome the "chicken and egg" problem, each microservice security group is always created regardless of whether the microservice itself is deployed in the environment or not. The creation of microservice security groups without corresponding microservices creates one or more empty security groups with no ingress or egress rules and is used solely to group together resources. In each microservice's definition, upon deployment, each microservice will add in the appropriate ingress and egress rules for that particular microservice. Since both ingress and egress rules are defined, two microservices must match their ingress and egress rules accordingly in order for communication to happen.

Figure 3:
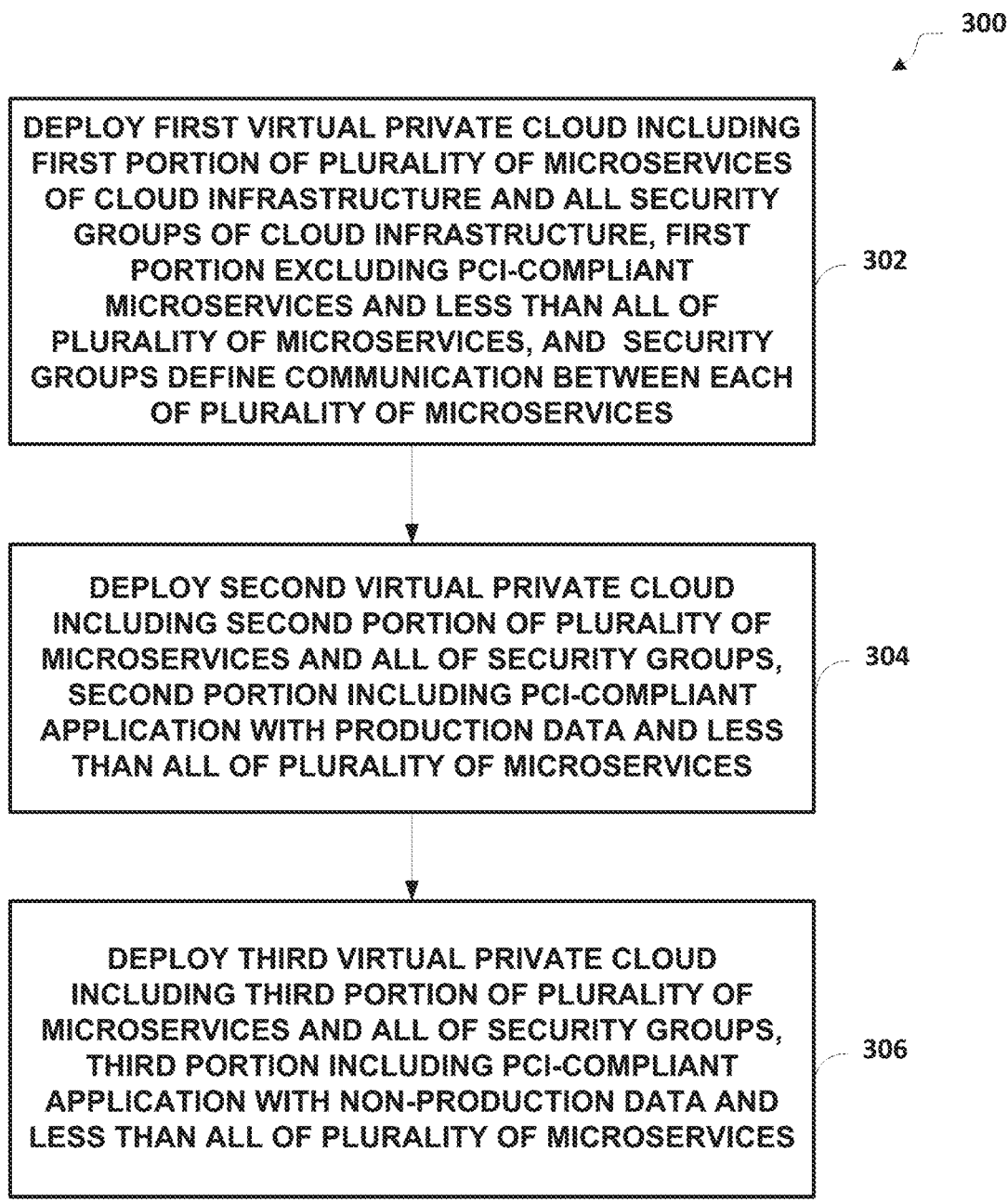
FIG. 3 is a flowchart illustrating an example method 300 for deploying each environment into one overarching deployment, in accordance with various aspects of the present disclosure.

FIG. 3 is a flowchart illustrating an example method 300 for deploying each environment into one overarching deployment. FIG. 3 is described with respect to the server 118 of FIG. 1. However, the method 300 is not limited to implementation by the server 118, but instead, may be implemented by a distribution of operations across or more servers or at least in part by the computing device 104.

As illustrated in FIG. 3, the method 300 includes deploying a first virtual private cloud including a first portion of a plurality of microservices of cloud infrastructure definitions and all security groups of the cloud infrastructure definitions, the first portion excluding PCI-compliant microservices and less than all of the plurality of microservices, and the security groups define communication between each of the plurality of microservices (at block 302). For example, the server 118 deploys a first virtual private cloud including a first portion of a plurality of microservices of cloud infrastructure definitions and all security groups of the cloud infrastructure definitions, the first portion excluding PCI-compliant microservices and less than all of the plurality of microservices, and the security groups define communication between each of the plurality of microservices.

The method 300 includes deploying a second virtual private cloud including a second portion of the plurality of microservices and the all of the security groups, the second portion including PCI-compliant applications with production data and less than the all of the plurality of microservices (at block 304). For example, the server 118 deploys a second virtual private cloud including a second portion of the plurality of microservices and the all of the security groups, the second portion including PCI-compliant applications with production data and less than the all of the plurality of microservices.

The method 300 includes deploying a third virtual private cloud including a third portion of the plurality of microservices and the all of the security groups, the third portion including PCI-compliant applications with non-production data and less than the all of the plurality of microservices (at block 306). For example, the server 118 deploys a third virtual private cloud including a third portion of the plurality of microservices and the all of the security groups, the third portion including PCI-compliant applications with non-production data and less than the all of the plurality of microservices.

In some examples, the method 300 includes receiving new cloud infrastructure definitions, and responsive to receiving the cloud infrastructure definitions, re-deploying the first virtual private cloud, the second virtual private cloud, and the third virtual private cloud. The re-deployment of the first virtual private cloud, the second virtual private cloud, and the third virtual private cloud maintains consistency between the new cloud infrastructure definitions and the first virtual private cloud, the second virtual private cloud, and the third virtual private cloud.

In some examples, each deployment of the first virtual private cloud, the second virtual private cloud, and third virtual private cloud in the method 300 may be broken into three sub-deployments: 1) VPC deployment, 2) Security Groups and VPC network governing rules deployment, and 3) Security Groups Rules and resources deployment.

In the VPC deployment, the deployment of the first virtual private cloud, the second virtual private cloud, and the third virtual private cloud occurs in parallel (and in some examples, at the same time) to each other. In these examples, the full parallel deployment of the first virtual private cloud, the second virtual private cloud, and the third virtual private cloud is followed by the deployment of Security Groups and VPC network governing rules in each of the first virtual private cloud, the second virtual private cloud, and the third virtual private cloud (referred to above as "Security Groups and VPC network governing rules deployment").

The deployment of the Security Groups and VPC network governing rules may be deployed in parallel or subsequent to each other. However, the full deployment of the Security Groups and VPC network governing rules occurs after the full deployment of the first virtual private cloud, the second virtual private cloud, and the third virtual private cloud.

Further, the deployment of Security Groups and VPC network governing rules in each of the first virtual private cloud, the second virtual private cloud, and the third virtual private cloud is followed by the deployment of all or a subset of the Security Group Rules and resources (referred to above as "Security Groups Rules and resources deployment"). The deployment of the all or the subset of the Security Group Rules and the resources may be deployed in parallel or subsequent to each other. However, the deployment of the all or the subset of the Security Group Rules and the resources occurs in parallel to or after the deployment of the Security Groups and the VPC network governing rules.

In other examples, in the VPC deployment, the deployment of the first virtual private cloud, the second virtual private cloud, and the third virtual private cloud may not occur in parallel to each other. In these examples, the deployment of Security Groups and VPC network governing rules in each of the first virtual private cloud, the second virtual private cloud, and the third virtual private cloud occurs after the full deployment of the first virtual private cloud, the second virtual private cloud, and the third virtual private cloud (referred to above as "Security Groups and VPC network governing rules deployment").

The deployment of the Security Groups and VPC network governing rules may be deployed in parallel or subsequent to each other. However, the deployment of the Security Groups and VPC network governing rules occurs after the full deployment of the first virtual private cloud, the second virtual private cloud, and the third virtual private cloud.

Further, the deployment of Security Groups and VPC network governing rules in each of the first virtual private cloud, the second virtual private cloud, and the third virtual private cloud is followed by the deployment of all or a subset of the Security Group Rules and resources (referred to above as "Security Groups Rules and resources deployment"). The deployment of the all or the subset of the Security Group Rules and the resources may be deployed in parallel or subsequent to each other. However, the deployment of the all or the subset of the Security Group Rules and the resources occurs in parallel to or after the deployment of the Security Groups and the VPC network governing rules.

Many different arrangements of the various components depicted, as well as components not shown, are possible without departing from the spirit and scope of the present disclosure. Embodiments of the present disclosure have been described with the intent to be illustrative rather than restrictive. Alternative embodiments will become apparent to those skilled in the art that do not depart from its scope. A skilled artisan may develop alternative means of implementing the aforementioned improvements without departing from the scope of the present disclosure. It should thus be noted that the matter contained in the above description or shown in the accompanying drawings is to be interpreted as illustrative and not in a limiting sense.

What is claimed is:

1. A server comprising:
a memory that stores cloud infrastructure definitions, the cloud infrastructure definitions including a plurality of microservices and security groups that define communication between each of the plurality of microservices; and an electronic processor communicatively connected to the memory, the electronic processor configured to:
deploy an initial instance of a first virtual private cloud including a first portion of the plurality of microservices and all of the security groups, the first portion excluding PCI-compliant microservices and including less than all of the plurality of microservices, and a first portion of the all of the security groups included in the first virtual private cloud are first empty security groups that do not include ingress or egress rules;
deploy an initial instance of a second virtual private cloud including a second portion of the plurality of microservices and the all of the security groups, the second portion including PCI-compliant applications with production data and less than the all of the plurality of microservices, and a second portion of the all of the security groups included in the second virtual private cloud are second empty security groups that do not include ingress or egress rules;
and deploy an initial instance of a third virtual private cloud including a third portion of the plurality of microservices and the all of the security groups, the third portion including PCI-compliant applications with test data and less than the all of the plurality of microservices, and wherein a third portion of the all of the security groups included in the third virtual private cloud are third empty security groups that do not include ingress or egress rules, wherein the second empty security groups and the third empty security groups are different from the first empty security groups and wherein upon deployment, each microservices of the plurality of microservices will add in appropriate ingress and egress rules and two microservices of the plurality of microservices must match their ingress and egress rules in order to communicate with each other.

2. The server of claim 1, wherein the electronic processor is further configured to:
receive new cloud infrastructure definitions that are different from the cloud infrastructure definitions, and responsive to receiving the new cloud infrastructure definitions, re-deploy the initial instance of the first virtual private cloud as a second instance of the first virtual private cloud that is different from the initial instance of the first virtual private cloud, the initial instance of the second virtual private cloud as a second instance of the second virtual private cloud that is different from the initial instance of the second virtual private cloud, and the initial instance of the third virtual private cloud as a second instance of the third virtual private cloud that is different from the initial instance of the third virtual private cloud,
wherein the re-deployment of the first virtual private cloud, the second virtual private cloud, and the third virtual private cloud maintains consistency between the new cloud infrastructure definitions and the first virtual private cloud, the second virtual private cloud, and the third virtual private cloud.

3. The server of claim 1, wherein the cloud infrastructure definitions include an interactive client-based deployment menu to deploy specific deployments of the cloud infrastructure definitions.

4. The server of claim 3, wherein the specific deployments are region-specific deployments that only deploys microservices that are used in a particular region, and wherein the specific deployments always create the all of the security groups.

5. The server of claim 4, wherein a first one or more security groups of the security groups with corresponding microservices specifies a second one or more security groups of the security groups as a set of ingress and egress destinations, and wherein the first empty security groups, the second empty security groups, and the third empty security groups are used to group together resources.

6. The server of claim 1, wherein the cloud infrastructure definitions further includes a networking directive including definitions for Network Access Control Lists (NACLs), Peering Connections, and Route Tables, a queue directive including definitions for creation of globally used Simple Queue Service (SQS) queues, a security-groups directive including definitions for creation of the security groups, and a storage directive including definitions for creating and configuring data storage.

7. The server of claim 1, wherein the first virtual private cloud, the second virtual private cloud, and the third virtual private cloud use a three-tier subnet architecture, wherein a first subnet of the three-tier subnet architecture is a public subnet that has internet gateways and is accessible from the Internet, wherein a second subnet of the three-tier subnet architecture is a private subnet that has a NAT gateway attached to the public subnet, and wherein a third subnet of the three-tier subnet architecture is a protected subnet that cannot access the Internet.

8. A method comprising:
deploying, with a server, an initial instance of a first virtual private cloud including a first portion of a plurality of microservices of cloud infrastructure definitions and all security groups of the cloud infrastructure definitions, the first portion excluding PCI-compliant microservices and including less than all of the plurality of microservices, and the security groups define communication between each of the plurality of microservices, and a first portion of the all of the security groups included in the first virtual private cloud are first empty security groups that do not include ingress or egress rules;
deploying, with the server, an initial instance of a second virtual private cloud including a second portion of the plurality of microservices and the all of the security groups, the second portion including PCI-compliant applications with production data and less than the all of the plurality of microservices, and a second portion of the all of the security groups included in the second virtual private cloud are second empty security groups that do not include ingress or egress rules; and deploying, with the server, an initial instance of a third virtual private cloud including a third portion of the plurality of microservices and the all of the security groups, the third portion including PCI-compliant applications with test data and less than the all of the plurality of microservices, and a third portion of the all of the security groups included in the third virtual private cloud are third empty security groups that do not include ingress or egress rules, wherein the second empty security groups and the third empty security groups are different from the first empty security groups, and wherein upon deployment, each microservices of the plurality of microservices will add in appropriate ingress and egress rules and two microservices of the plurality of microservices must match their ingress and egress rules in order to communicate with each other.

9. The method of claim 8, further comprising:
receiving new cloud infrastructure definitions that are different from the cloud infrastructure definitions, and
responsive to receiving the new cloud infrastructure definitions, re-deploying the initial instance of the first virtual private cloud as a second instance of the first virtual private cloud that is different from the initial instance of the first virtual private cloud, the initial instance of the second virtual private cloud as a second instance of the second virtual private cloud that is different from the initial instance of the second virtual private cloud, and the initial instance of the third virtual private cloud as a second instance of the third virtual private cloud that is different from the initial instance of the third virtual private cloud,
wherein the re-deployment of the first virtual private cloud, the second virtual private cloud, and the third virtual private cloud maintains consistency between the new cloud infrastructure definitions and the first virtual private cloud, the second virtual private cloud, and the third virtual private cloud.

10. The method of claim 8, wherein the cloud infrastructure definitions include an interactive client-based deployment menu to deploy specific deployments of the cloud infrastructure definitions.

11. The method of claim 10, wherein the specific deployments are region-specific deployments that only deploys microservices that are used in a particular region, and wherein the specific deployments always create the all of the security groups.

12. The method of claim 11, wherein a first one or more security groups of the security groups with corresponding microservices specifies a second one or more security groups of the security groups as a set of ingress and egress destinations, and wherein the first empty security groups, the second empty security groups, and the third empty security groups are used to group together resources.

13. The method of claim 8, wherein the cloud infrastructure definitions further includes a networking directive including definitions for Network Access Control Lists (NACLs), Peering Connections, and Route Tables, a queue directive including definitions for creation of globally used Simple Queue Service (SQS) queues, a security-groups directive including definitions for creation of the security groups, and a storage directive including definitions for creating and configuring data storage.

14. The method of claim 8, wherein the first virtual private cloud, the second virtual private cloud, and the third virtual private cloud use a three-tier subnet architecture, wherein a first subnet of the three-tier subnet architecture is a public subnet that has internet gateways and is accessible from the Internet, wherein a second subnet of the three-tier subnet architecture is a private subnet that has a NAT gateway attached to the public subnet, and wherein a third subnet of the three-tier subnet architecture is a protected subnet that cannot access the Internet.

15. A non-transitory computer-readable medium comprising instructions that, when executed by an electronic processor, cause the electronic processor to perform a set of operations comprising:
deploying an initial instance of a first virtual private cloud including a first portion of a plurality of microservices of cloud infrastructure definitions and all security groups of the cloud infrastructure definitions, the first portion excluding PCI-compliant microservices and including less than all of the plurality of microservices, and the security groups define communication between each of the plurality of microservices, and a first portion of the all of the security groups included in the first virtual private cloud are first empty security groups that do not include ingress or egress rules;
deploying an initial instance of a second virtual private cloud including a second portion of the plurality of microservices and the all of the security groups, the second portion including PCI-compliant applications with production data and less than the all of the plurality of microservices, and a second portion of the all of the security groups included in the second virtual private cloud are second empty security groups that do not include ingress or egress rules; and
deploying an initial instance of a third virtual private cloud including a third portion of the plurality of microservices and the all of the security groups, the third portion including PCI-compliant applications with test data and less than the all of the plurality of microservices, and a third portion of the all of the security groups included in the third virtual private cloud are third empty security groups that do not include ingress or egress rules, wherein the second empty security groups and the third empty security groups are different from the first empty security groups, and wherein upon deployment, each microservices of the plurality of microservices will add in appropriate ingress and egress rules and two microservices of the plurality of microservices must match their ingress and egress rules in order to communicate with each other.

16. The non-transitory computer-readable medium of claim 15, further comprising:
receiving new cloud infrastructure definitions that are different from the cloud infrastructure definitions, and
responsive to receiving the new cloud infrastructure definitions, re-deploying the initial instance of the first virtual private cloud as a second instance of the first virtual private cloud that is different from the initial instance of the first virtual private cloud, the initial instance of the second virtual private cloud as a second instance of the second virtual private cloud that is different from the initial instance of the second virtual private cloud, and the initial instance of the third virtual private cloud as a second instance of the third virtual private cloud that is different from the initial instance of the third virtual private cloud, wherein the re-deployment of the first virtual private cloud, the second virtual private cloud, and the third virtual private cloud maintains consistency between the new cloud infrastructure definitions and the first virtual private cloud, the second virtual private cloud, and the third virtual private cloud.

17. The non-transitory computer-readable medium of claim 15, wherein the cloud infrastructure definitions include an interactive client-based deployment menu to deploy specific deployments of the cloud infrastructure definitions.

18. The non-transitory computer-readable medium of claim 17, wherein the specific deployments are region-specific deployments that only deploys microservices that are used in a particular region, and wherein the specific deployments always create the all of the security groups.

19. The non-transitory computer-readable medium of claim 18, wherein a first one or more security groups of the security groups with corresponding microservices specifies a second one or more security groups of the security groups as a set of ingress and egress destinations, and wherein the first empty security groups, the second empty security groups, and the third empty security groups are used to group together resources.

20. The non-transitory computer-readable medium of claim 15, wherein the first virtual private cloud, the second virtual private cloud, and the third virtual private cloud use a three-tier subnet architecture, wherein a first subnet of the three-tier subnet architecture is a public subnet that has internet gateways and is accessible from the Internet, wherein a second subnet of the three-tier subnet architecture is a private subnet that has a NAT gateway attached to the public subnet, and wherein a third subnet of the three-tier subnet architecture is a protected subnet that cannot access the Internet.

\* \* \* \* \*